US009489502B2

(12) United States Patent
Davis et al.

(10) Patent No.: US 9,489,502 B2
(45) Date of Patent: Nov. 8, 2016

(54) BIOMETRIC AUTHENTICATION DISPLAY

(71) Applicant: Lenovo (Singapore) Pte. Ltd., Singapore (SG)

(72) Inventors: Mark Charles Davis, Durham, NC (US); Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 460 days.

(21) Appl. No.: 14/172,343

(22) Filed: Feb. 4, 2014

(65) Prior Publication Data

US 2015/0220714 A1 Aug. 6, 2015

(51) Int. Cl.
*G06F 21/32* (2013.01)
*G06Q 50/26* (2012.01)
*G06Q 10/10* (2012.01)
*G07C 9/00* (2006.01)
*G06Q 20/40* (2012.01)

(52) U.S. Cl.
CPC .............. *G06F 21/32* (2013.01); *G06Q 10/10* (2013.01); *G06Q 20/40145* (2013.01); *G06Q 50/265* (2013.01); *G07C 9/00087* (2013.01); *G07C 2009/00095* (2013.01)

(58) Field of Classification Search
CPC ...................................................... G06F 21/32
See application file for complete search history.

(56) References Cited

U.S. PATENT DOCUMENTS

| 5,457,747 | A | 10/1995 | Drexler et al. | |
| 6,848,617 | B1 | 2/2005 | Fries et al. | |
| 9,306,741 | B1 * | 4/2016 | Brainard | H04L 63/08 |
| 2003/0105964 | A1 * | 6/2003 | Brainard | G06Q 20/32 |
| | | | | 713/178 |
| 2003/0226041 | A1 | 12/2003 | Palmer et al. | |
| 2004/0036601 | A1 * | 2/2004 | Obradovich | G08G 1/167 |
| | | | | 340/540 |
| 2004/0172535 | A1 * | 9/2004 | Jakobsson | G06Q 20/341 |
| | | | | 713/168 |
| 2005/0240778 | A1 | 10/2005 | Saito | |
| 2006/0218097 | A1 | 9/2006 | Walker et al. | |
| 2007/0027804 | A1 * | 2/2007 | Vega | G06Q 20/10 |
| | | | | 705/39 |
| 2007/0073619 | A1 | 3/2007 | Smith | |
| 2007/0289000 | A1 | 12/2007 | Weiss | |

(Continued)

FOREIGN PATENT DOCUMENTS

| EP | 2175344 A2 | 4/2010 |
| EP | 2360560 A1 | 8/2011 |

(Continued)

OTHER PUBLICATIONS

Qin et al.; pPen: enabling authenticated pen and touch interaction on tabletop surfaces; Proceeding ITS '10 ACM International Conference on Interactive Tabletops and Surfaces; 2010; pp. 283-284; ACM Digital Library.*

(Continued)

*Primary Examiner* — Bradley Holder
(74) *Attorney, Agent, or Firm* — Brian J. Pangrle

(57) ABSTRACT

A device can include a display; memory that stores biometric information and commercial information; a sensor that senses biometric information; authentication circuitry that authenticates sensed biometric information at least in part via a comparison to stored biometric information; and display circuitry that renders at least one graphic to the display based at least in part on a portion of the commercial information responsive to authentication of sensed biometric information. Various other apparatuses, systems, methods, etc., are also disclosed.

15 Claims, 12 Drawing Sheets

(56) References Cited

U.S. PATENT DOCUMENTS

| | | |
|---|---|---|
| 2008/0028230 A1 | 1/2008 | Shatford |
| 2008/0029608 A1 | 2/2008 | Kellum et al. |
| 2008/0087720 A1* | 4/2008 | Levitov ............... G07F 9/06 235/379 |
| 2010/0291909 A1* | 11/2010 | Nagaraja ............ H04M 1/575 455/415 |
| 2011/0102141 A1 | 5/2011 | Wu |
| 2013/0036463 A1 | 2/2013 | Shashidhar |
| 2013/0056539 A1 | 3/2013 | Iwaloye |
| 2013/0111600 A1* | 5/2013 | Guenther ............ G06F 21/72 726/26 |
| 2013/0194176 A1 | 8/2013 | Chung |
| 2013/0207786 A1 | 8/2013 | Hutzler et al. |
| 2013/0208103 A1* | 8/2013 | Sands ................ G06F 21/31 348/78 |
| 2014/0074696 A1 | 3/2014 | Glaser |

FOREIGN PATENT DOCUMENTS

| | | |
|---|---|---|
| EP | 2680099 A2 | 1/2014 |
| EP | 2720129 A1 | 4/2014 |
| EP | 2725472 A2 | 4/2014 |
| EP | 2816442 A1 | 12/2014 |
| WO | 2009055303 A1 | 4/2009 |
| WO | 2013163233 A1 | 10/2013 |
| WO | 2013186682 A1 | 12/2013 |

OTHER PUBLICATIONS

Popel et al.; BIOGLYPH: biometric identification in pervasive environments; Published in: Seventh IEEE International Symposium on Multimedia (ISM'05); Date of Conference: Dec. 12-14, 2005; IEEE Xplore.*

Combined Search and Examination Report GB1421405.0 of May 28, 2015 (8 pages).

Sharrock, Time dependence of switching fields in magnetic recording media, J. Appl. Phys. 76 (10), Nov. 15, 1994 (6 pages).

Miaxis Biometrics Co., Ltd. SM-621 Fingerprint Verification Module User Manual (V1.0), Jan. 24, 2007 (36 pages).

Matsumoto et al., Thermally Assisted Magnetic Recording, Fujitsu Sci. Tech. J., 32, 1, p. 158-167, Jan. 2006 (10 pages).

MAKStripe Parallel Port (http://www.makinterface.de/makstripee.php3) 2005(?) (19 pages).

Brush Industries, SideWinder, 2010 (2 pages).

Silicon Labs, Magnetic Stripe Reader (AN148) Rev. 1.3 8/08 (2008) (82 pages).

JP Morgan, Single-Use Accounts AP, 2011 (2 pages).

JP Morgan, ServiceMaster, 2009 (2 pages).

\* cited by examiner

BIOMETRIC AUTHENTICATION DISPLAY

CROSS-REFERENCE TO RELATED APPLICATIONS

This application is related to commonly assigned U.S. patent application Ser. No. 14/172,313, entitled BIOMETRIC AUTHENTICATION STRIPE, which has been filed on the same date as this application and which is incorporated by reference herein in its entirety and this application is related to commonly assigned U.S. patent application Ser. No. 14/172,416, entitled BIOMETRIC ACCOUNT CARD, which has been filed on the same date as this application and which is incorporated by reference herein in its entirety.

TECHNICAL FIELD

Subject matter disclosed herein generally relates to information storage devices technologies.

BACKGROUND

An information storage device such as, for example, a credit card may include a stripe that includes magnetic material that has been encoded with one or more tracks of information. As an example, such a card may be read by a reader for purposes of a financial transaction. As the information stored in the stripe is persistent, generally for years, a lost or stolen card may be used illicitly. Various technologies and techniques described herein pertain to information storage devices such as, for example, credit cards.

SUMMARY

A device can include a display; memory that stores biometric information and commercial information; a sensor that senses biometric information; authentication circuitry that authenticates sensed biometric information at least in part via a comparison to stored biometric information; and display circuitry that renders at least one graphic to the display based at least in part on a portion of the commercial information responsive to authentication of sensed biometric information. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
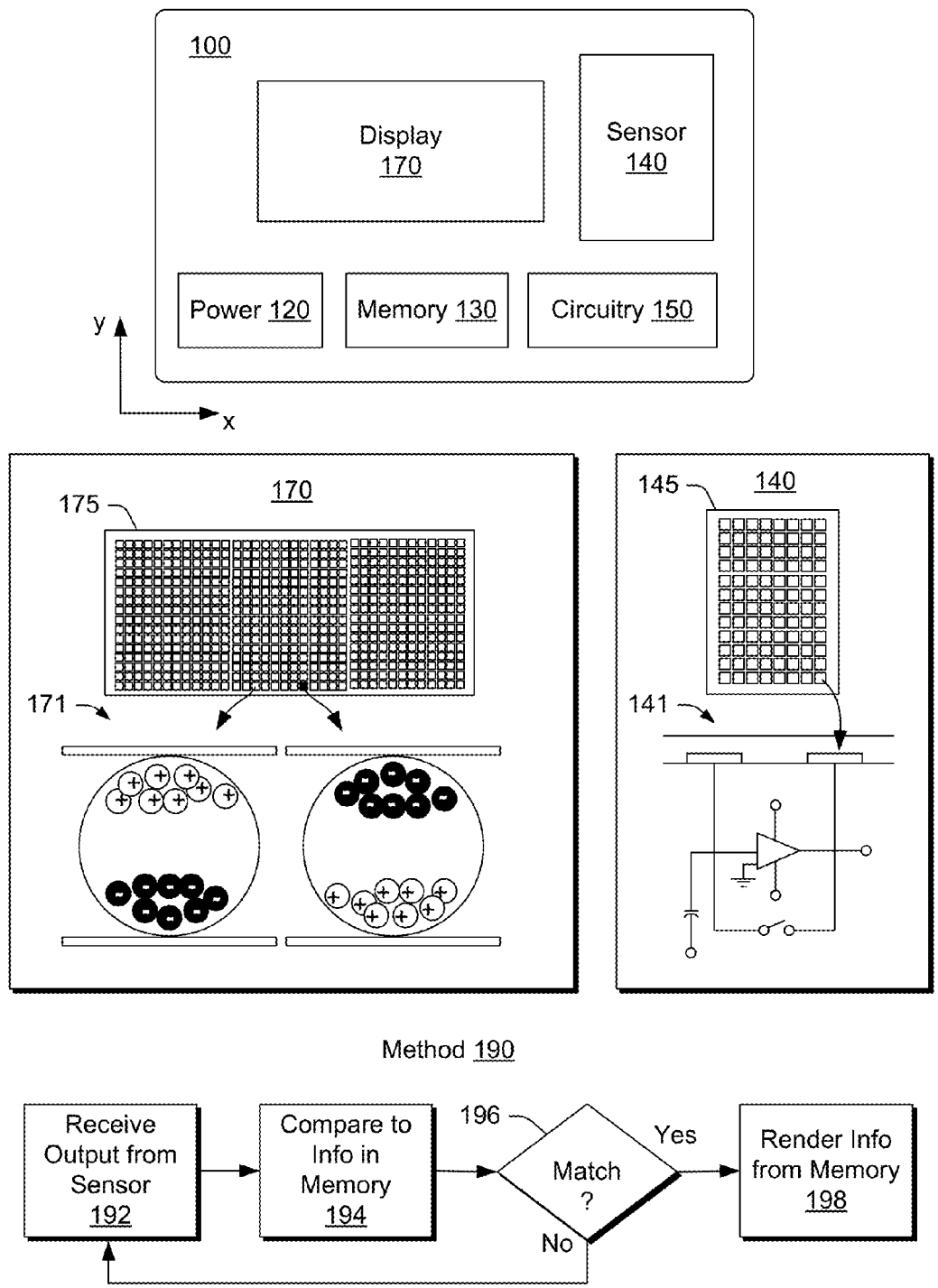
FIG. 1 is a diagram of an example of a device that may have a card form factor and an example of a method.

The following description includes the best mode presently contemplated for practicing the described implementations. This description is not to be taken in a limiting sense, but rather is made merely for the purpose of describing general principles of various implementations. The scope of invention should be ascertained with reference to issued claims.

As mentioned, an information storage device such as, for example, a credit card may include a strip or stripe that includes magnetic material that has been encoded with one or more tracks of information. If such a credit card is stolen, it may be used for illicit transactions, which may cause losses to a credit card company, insurance company, merchant, end user, etc. To help mitigate risks, a credit card or a debit card may have an associated PIN (e.g., personal identification number). However, a PIN may be guessed, observed, etc. And, use of a PIN may be inconvenient and require particular point of sale (POS) hardware, circuitry, etc.

As an example, a credit card sized device may include an e-ink display (e.g., black and white, color, etc.), a fingerprint reader, memory and a microcontroller. In such an example, the memory may store information such as tokens, which may represent account or other information. As an example, authentication of a fingerprint via the fingerprint reader may cause the device to render information associated with a token to the display. Where the memory of the device stores multiple tokens, as an example, the device may switch between tokens (e.g., select one of the multiple tokens) via a navigation mechanism. For example, authenticating a fingerprint more than once within a period of time (e.g., about a few seconds) may cause a pointer to increment from one token to another token where, for example, after each authentication information associated with a different token may be rendered to the display. As an example, a navigation mechanism may be a button, for example, a touch sensitive mechanism that may sense touches and increment a pointer in response to a touch. As an example, a fingerprint sensor may be a navigation mechanism, for example, where the fingerprint sensor may be configured to perform at least one or more functions of a touchpad.

As an example, a navigation mechanism may include selection circuitry, for example, for selection of an item, a feature, a control, a command, etc. In such an example, input may be received via a navigation mechanism to navigate items, features, controls, commands, etc. and selection circuitry may act to select one of the items, features, controls, commands, etc. For example, where information associated with a list of accounts may be rendered to a display, a navigation mechanism may provide for scrolling through the list such that selection circuitry may select one of the accounts in the list. Selection circuitry may operate in an active, a passive or other manner. For example, navigating to an item and stopping for a period of time may act to select that item. As another example, navigating to an item and entering a selection command may act to select that item (e.g., a touch, a double tap, etc.).

FIG. 1 shows an example of a device 100 that includes a power source 120, memory 130, a sensor 140, circuitry 150 and a display 170. As an example, the sensor 140 may include a sensor window 145 and the display 170 may include a display window 175 that may be defined with respect to a coordinate system such as, for example, a Cartesian coordinate system (see, e.g., x and y coordinates in FIG. 1).

In the example of FIG. 1, the memory 130 may store information; the sensor 140 may sense information; the circuitry 150 may authenticate sensed information (e.g., authentication circuitry); and the display 170 may output information, for example, based at least in part on a portion of stored information responsive to authentication of sensed information.

As an example, the sensor 140 may be a fingerprint sensor. For example, a fingerprint sensor may include circuitry 141 that operates based in part on capacitance. In such an example, the sensor window 145 of the sensor 140 may include a grid of electrodes (e.g., conductor plates) arranged with respect to an insulating layer (e.g., that forms a capacitor with respect to the electrodes and portions of a finger). As to sensing a fingerprint, ridges and valleys may be sensed differently by a grid of electrodes such that an approximate representation of the fingerprint may be electronically determined and, for example, output to circuitry for analysis. As an example, the circuitry 150 may receive output from the sensor 140 and analyze the output with respect to stored information. In such an example, the stored information may be representative of a known fingerprint. For example, consider information representative of a known fingerprint of an account holder of account information stored in the memory 130 of the device 100, an owner of the device 100, an authorized user of the device 100, etc.

As an example, a passive capacitance sensor may include an array of elements that may act individually as one plate of a parallel-plate capacitor. As to a fingerprint sensor, a dermal layer (e.g., an electrically conductive layer) may act as an opposing plate and a substantially non-conductive epidermal layer may acts as dielectric layer. In such a sensor, the elements may sense differences in the dielectric layer (e.g., via capacitance) where such differences depend on characteristics of a fingerprint (e.g., a finger or a thumb). For example, capacitance may vary between ridges and valleys of a fingerprint due to the fact that the volume between a dermal layer and a sensing element in valleys includes an air gap. As an example, the dielectric constant of an epidermis and area of a sensing element may be known and measured capacitance values may be used to distinguish between fingerprint ridges and valleys.

As an example, an active capacitance sensor may measure ridge patterns of a dermal layer. For example, an active capacitance sensor may use a charging cycle to apply a voltage to skin before measurement takes place. In such an example, the application of voltage may act to charge the effective capacitor. On a discharge cycle, the voltage across a dermal layer and a sensing element may be compared to a reference voltage for purposes of calculating capacitance. In such an example, distance values may be calculated and used to form an image of a fingerprint. An active capacitance sensor may be more immune to cleanliness of a sensing surface (e.g., a sensor window) and cleanliness of skin.

In the example of FIG. 1, the display 170 may include display circuitry 171. As shown, the display circuitry 171 may be so-called e-ink circuitry. As an example, the display circuitry 171 may include vesicles of pigmented and charged particles (e.g., pigment chips) that can migrate in the vesicles in response to an applied charge. For example, vesicles may be organized in a grid between a layer of upper electrodes and a layer of lower electrodes where, for example, the layer of upper electrodes may be an optically transparent layer (e.g., indium tin oxide electrodes, etc.). Where the vesicles include positively charged particles of one color (e.g., white) and negatively charged particles of another color (e.g., black), application of charges to the layers of electrodes may cause the particles to migrate to thereby render a graphic or graphics (e.g., letters, numbers, symbols, patterns, etc.). Where the vesicles include a fluid of sufficient viscosity in comparison to density of the particles, the rendered graphic or graphics may persist (e.g., even where no charge is applied to the layers of the electrodes).

As an example, the display 170 of the device 100 may be an electrophoretic display that may be bi-stable, for example, without a need for power to maintain a rendered graphic or graphics. As an example, vesicles in an e-ink film may be disposed over an active-matrix thin-film transistor (TFT) backplane. As an example, a display may be driven at least in part by "chip on glass" circuits and timing control circuitry (e.g., a microcontroller, etc.). As an example, a display may be defined in part by a number of pixels, a number of pixels per unit distance, etc. As an example, an e-ink display may include "ink" for at least one of black and white, grayscale and color.

FIG. 1 also shows an example of a method 190 that includes a reception block 192 for receiving output from a sensor, a comparison block 194 for comparing at least a portion of the received output (e.g., directly and/or indirectly) to information stored in memory, a decision block 196 for deciding if a match exists based at least in part on the comparing and a render block 198 for rendering information from memory (e.g., directly and/or indirectly) to a display. In such an example, the rendered information may be displayed for a period of time and then erased. For example, where a display includes e-ink circuitry, charges may be applied to render information and charges may be applied to erase information or to otherwise return the display to a particular state. As an example, a display may include a base state that displays a name, a word, a phrase (e.g., "secure card", "touch to authorize", etc.), etc.

Figure 2:
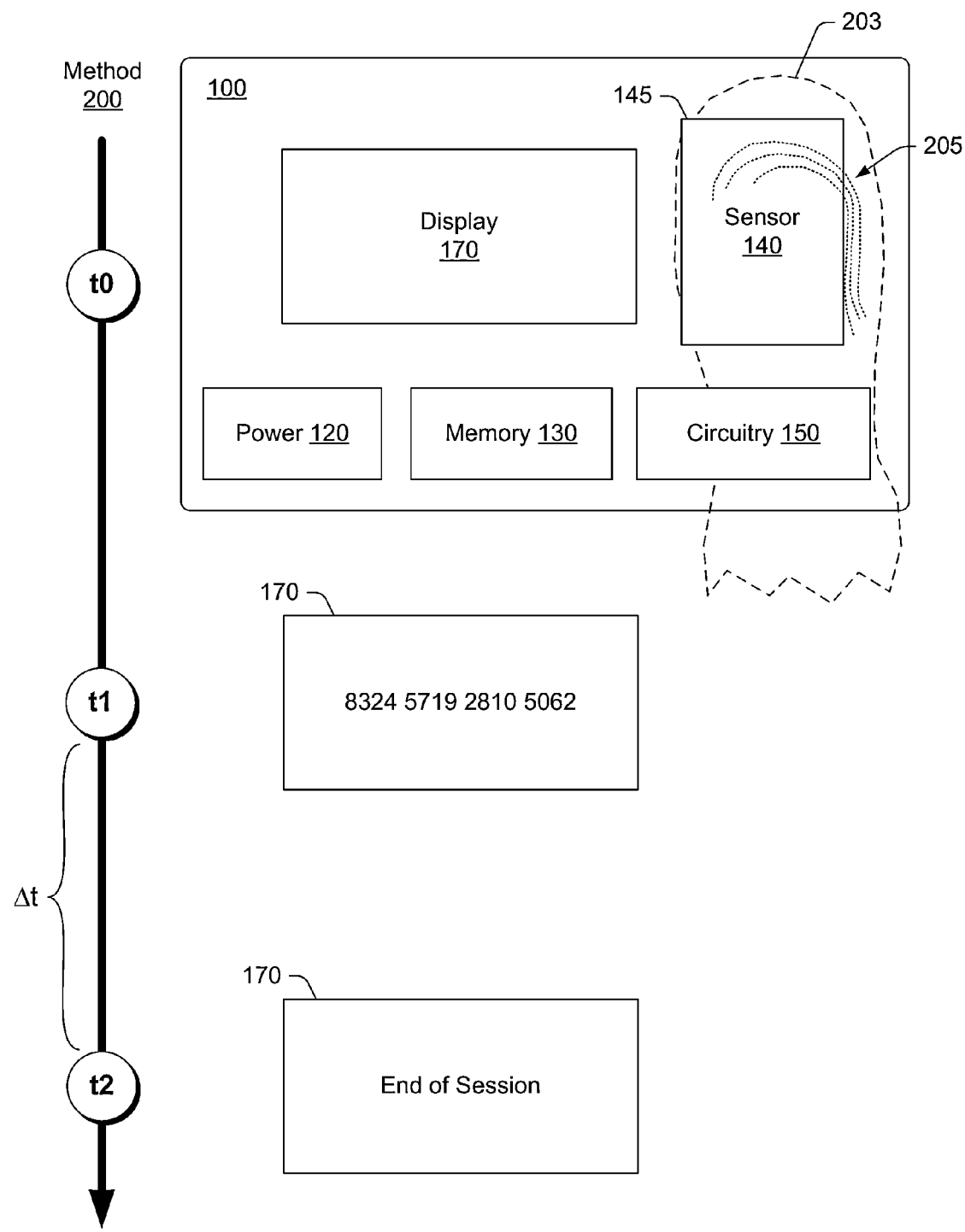
FIG. 2 is a diagram of an example of a method that may be implemented by the device of FIG. 1.

FIG. 2 shows an example of a method 200 with respect to a time line where the method 200 may include using the device 100. As shown in the example of FIG. 2, at a time t0, a finger 203 with a fingerprint 205 is positioned with respect to the sensor window 145 associated with the sensor 140 of the device 100. At a time t1, the display 170 displays information responsive to authentication of the fingerprint 205 (e.g., via the circuitry 150). In such an example, the information may be in the form of one or more graphics (e.g., letters, numbers, symbols, etc.), which may be based at least in part on information stored in the memory 130 of the device 100. As an example, the information may be an account number (e.g., a sixteen digit account number).

At a time less than t2 and greater than t1, denoted Δt, the display 170 persists the information, which may be deemed "secure" information as it is rendered to the display 170 in response to authentication of the fingerprint 205. At time t2, the device 100 may erase the information and, for example, optionally display other information such as, for example, a message (e.g., "End of Session").

Figure 3:
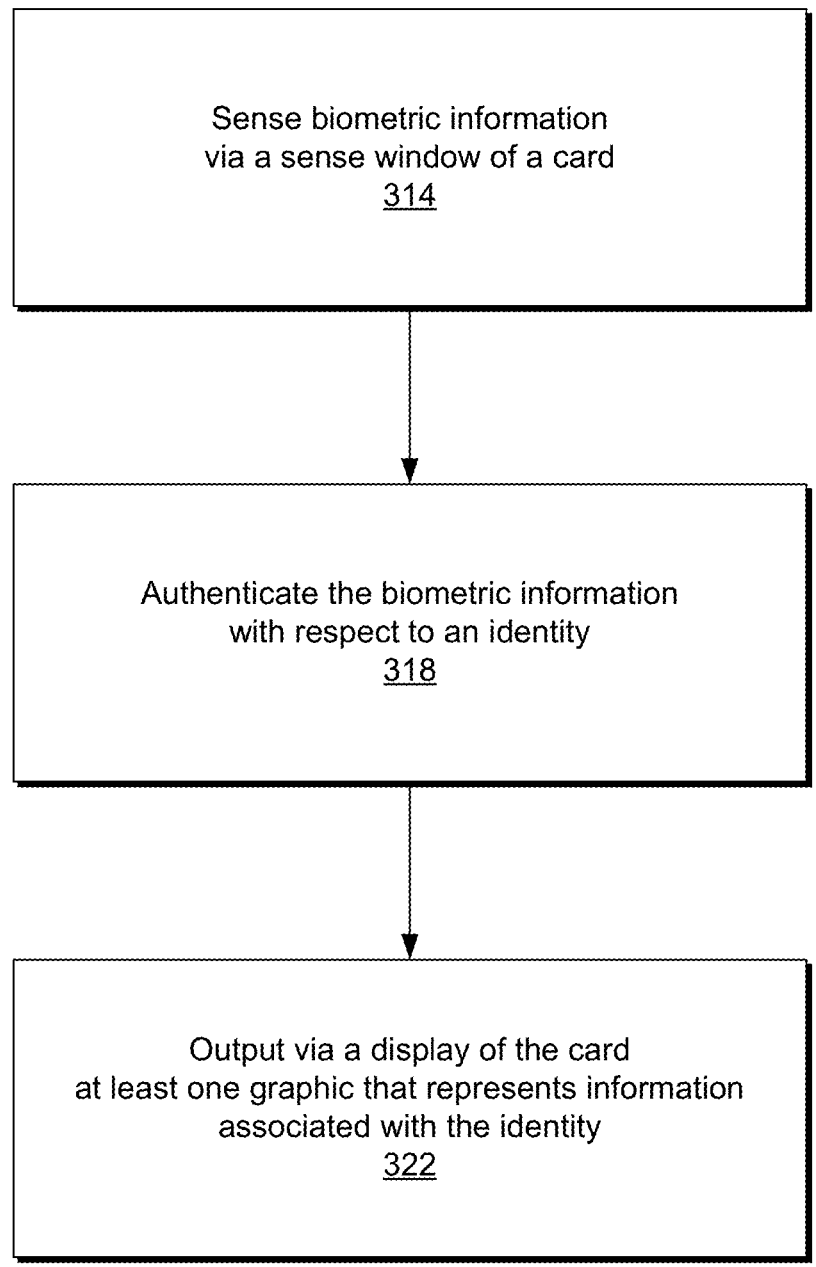
FIG. 3 is a diagram of an example of a method.

FIG. 3 shows an example of a method 310 that includes a sense block 314 for sensing biometric information via a sense window of a card; an authentication block 318 for authenticating the biometric information with respect to an identity; and an output block 322 for, responsive to the authenticating, outputting via a display of the card at least one graphic that represents information associated with the identity. In such an example, the information may be commercial information, for example, for purposes of a commercial transaction (e.g., purchase of goods, purchase of services, deposit of currency, withdrawal of currency, etc.). As an example, the method 310 may include sensing biometric information via a touch sensor, a fingerprint sensor, etc. As an example, a touch sensor may optionally be configured to sense handwriting. For example, a touch sensor may include a sense window for input of handwriting via a finger, an implement (e.g., a stylus), etc.

Figure 4:
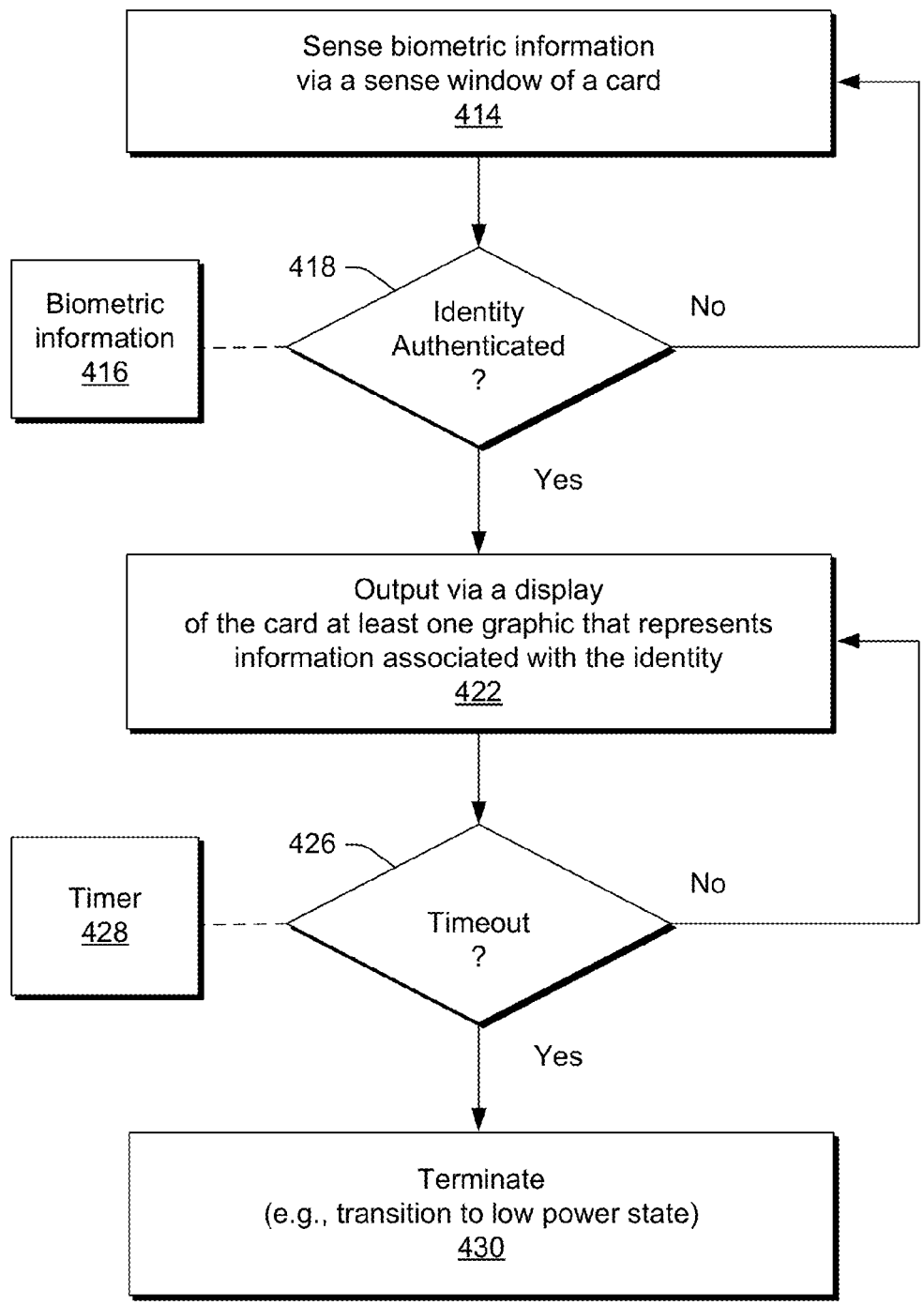
FIG. 4 is a diagram of an example of a method.

FIG. 4 shows an example of a method 410 that includes a sense block 414 for sensing biometric information via a sense window of a card, a decision block 418 for deciding whether the sensed biometric information has been authenticated by the card with respect to an identity (e.g., via accessing stored biometric information 416 associated with the identity), an output block 422 for outputting via a display of the card at least one graphic that represents information associated with the identity, a decision block 426 for deciding whether a timeout has occurred (e.g., via information from a timer 528), and a termination block 430 for terminating the output of the at least one graphic via the display of the card and, for example, optionally transitioning the card to a low power state.

In the example of FIG. 4, the decision block 418 may return to the sense block 414 where an identity is not authenticated (e.g., "no" branch) and, as shown, proceed to the output block 422 where an identity is authenticated (e.g., "yes" branch). In the example of FIG. 4, the decision block 426 may return to the output block 422 where a timeout has not occurred (e.g., "no" branch) and, as shown, proceed to the termination block 430 where a timeout has occurred (e.g., "yes" branch).

Figure 5:
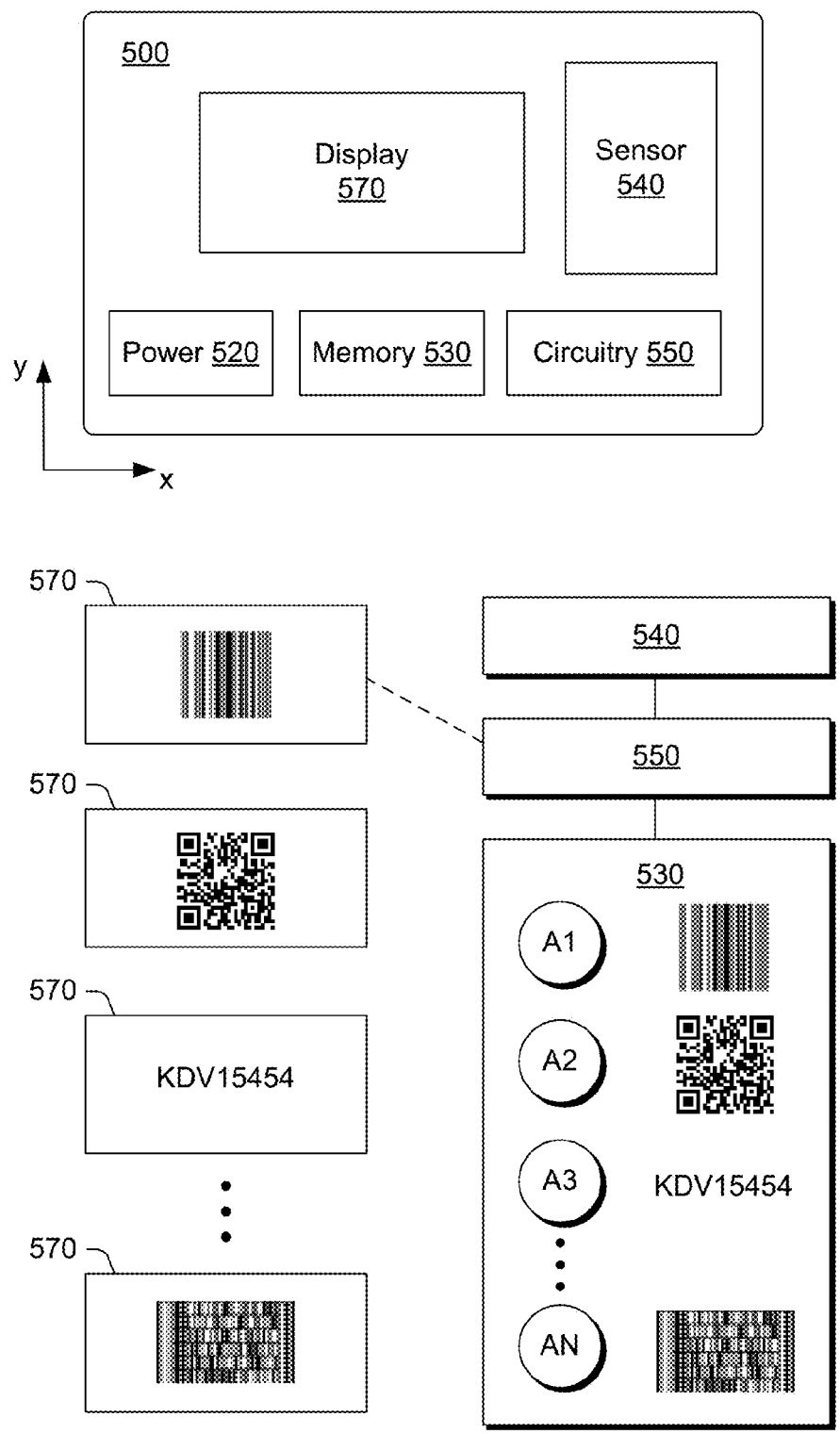
FIG. 5 is a diagram of an example of a device and examples of graphics.

FIG. 5 shows an example of a device 500 that includes a power source 520, memory 530, a sensor 540, circuitry 550 and a display 570. In the example of FIG. 5, the memory 530 may store information; the sensor 540 may sense information; the circuitry 550 may authenticate sensed information (e.g., authentication circuitry); and the display 570 may output information, for example, based at least in part on a portion of stored information responsive to authentication of sensed information.

As shown in the example of FIG. 5, the memory 530 may include information A1, A2, A3, . . . AN. As an example, such information may be associated with one or more graphics. For example, the information A1 may be associated with a bar code (e.g., a universal product code "UPC"), the information A2 may be associated with a quick response code (e.g., a "QRC"), the information A3 may be associated with a numeric or alphanumeric code, etc.

As mentioned, where memory of a device stores multiple tokens, as an example, the device may switch between tokens (e.g., select one of the multiple tokens) via a navigation mechanism. Thus, in the example of FIG. 5, A1, A2, A3, . . . AN may represent tokens. In such an example, authenticating a fingerprint more than once within a period of time (e.g., about a few seconds) may cause a pointer to increment from one token to another token where, for example, after each authentication information associated with a different token may be rendered to the display. As an example, a navigation mechanism may be a button, for example, a touch sensitive mechanism that may sense touches and increment a pointer in response to a touch. In such an example, a prolonged touch or lack of a subsequent touch may act to make a selection as to particular information (e.g., an item in a list, etc.). As an example, a fingerprint sensor may be a navigation mechanism, for example, where the fingerprint sensor may be configured to perform at least one or more functions of a touchpad (e.g., navigation, selection, etc.).

While the example of FIG. 5 illustrates graphics that may be somewhat undecipherable to the human eye, a display may optionally display accompanying information such as account names, etc. that may be more readily understood by a user (e.g., debit card, credit card, driver's license, boarding pass, etc.).

Figure 6:
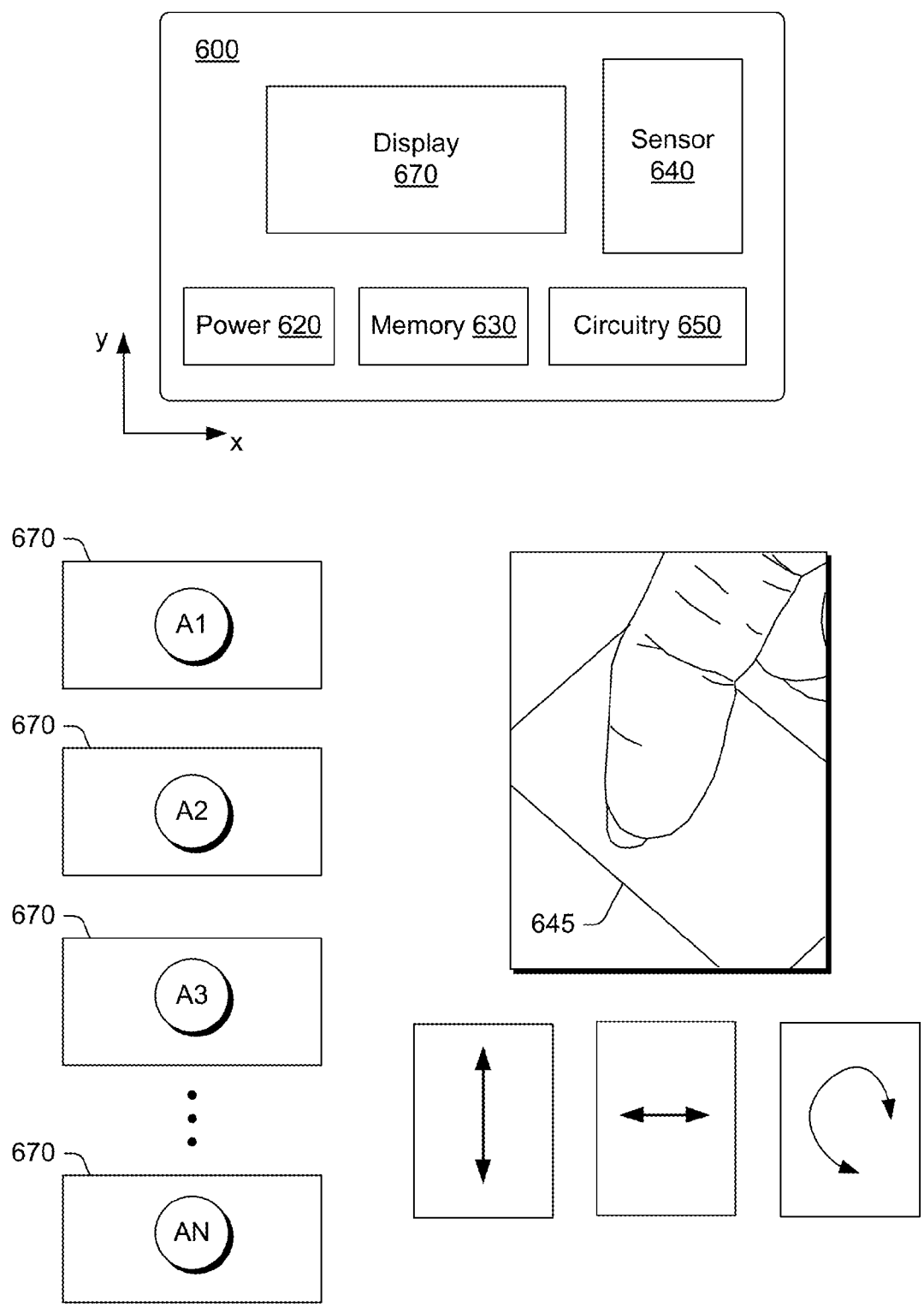
FIG. 6 is a diagram of an example of a device and examples of inputs via a sensor window.

FIG. 6 shows an example of a device 600 that includes a power source 620, memory 630, a sensor 640, circuitry 650 and a display 670. In the example of FIG. 6, the memory 630 may store information; the sensor 640 may sense information; the circuitry 650 may authenticate sensed information (e.g., authentication circuitry); and the display 670 may output information, for example, based at least in part on a portion of stored information responsive to authentication of sensed information.

In the example of FIG. 6, the memory 630 may include information A1, A2, A3, . . . AN, which may be referred to as tokens. As an example, each of such tokens may be associated with one or more graphics. In the example of FIG. 6, the sensor 640 may include a sensor window 645 that may be configured to sense input, for example, such as a finger (e.g., at least a portion of a finger such as a flesh portion, a fingernail portion, etc.). For example, a user may contact the sensor window 645 with a portion of a finger and make a motion that can be sensed by the sensor 640. In such an example, the sensor 640 may act in a manner akin to a touchpad (e.g., trackpad) for purposes of navigating, instructing, etc. For example, an up motion or a down motion may be sensed to increment from token A1 to token A2, etc. As an example, a sidewise motion may be sensed to select a token. As an example, a curved motion may act to navigate (e.g., scroll) through a series of tokens.

While various examples of motion are illustrated in FIG. 6, the sensor 640 may be configured as a button, for example, to increment an index responsive to touch. In such an example, responsive to authentication of a fingerprint by the sensor 640, the sensor 640 may function as a button where successive touches navigate through tokens (e.g., consider the tokens A1, A2, A3, . . . AN). As an example, the display 670 may display information associated with each of the tokens as they are being navigated.

Figure 7:
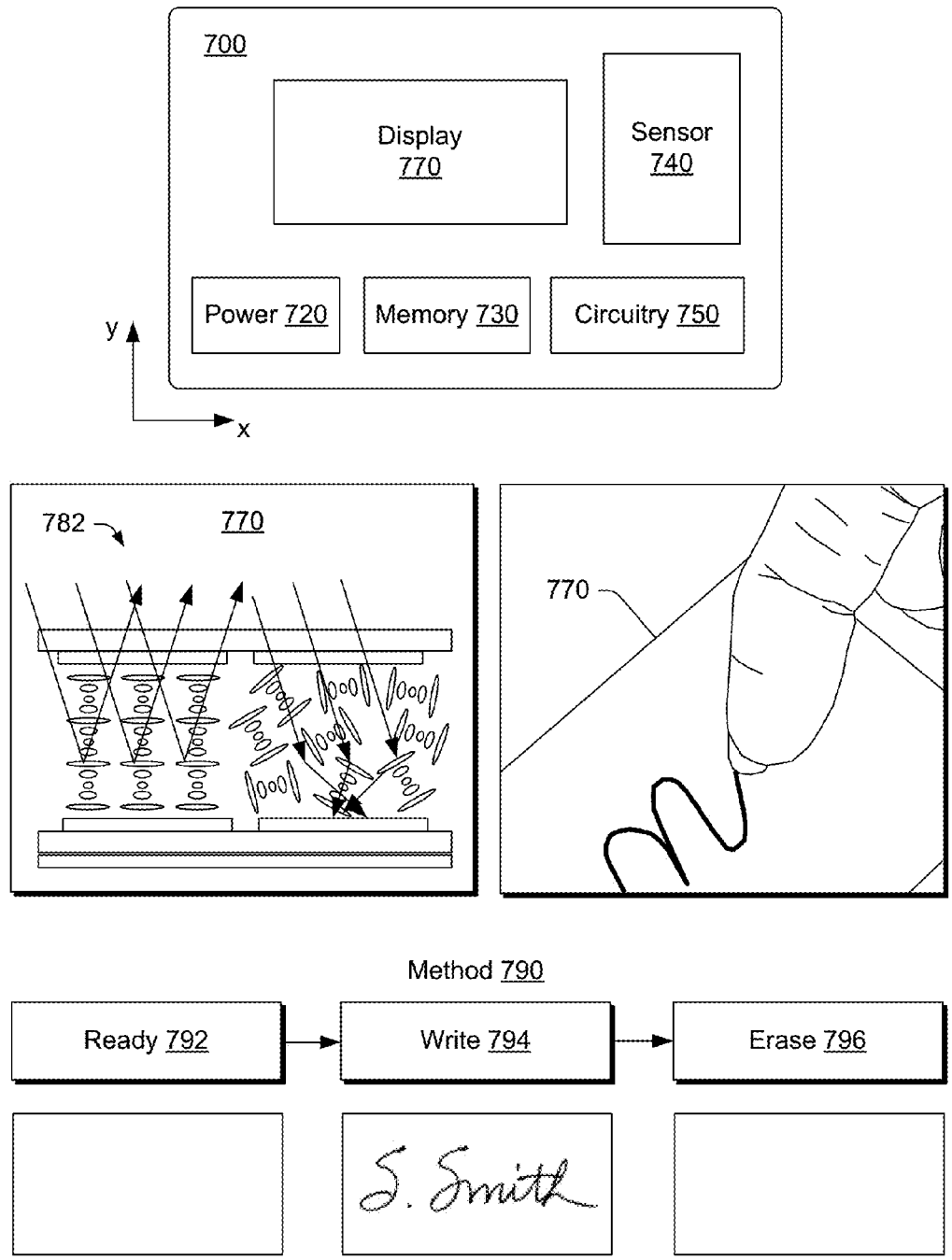
FIG. 7 is a diagram of an example of a device and an example of a method.

FIG. 7 shows an example of a device 700 that includes a power source 720, memory 730, a sensor 740, circuitry 750 and a display 770. In the example of FIG. 7, the memory 730 may store information; the sensor 740 may sense information; the circuitry 750 may authenticate sensed information (e.g., authentication circuitry); and the display 770 may output information, for example, based at least in part on a portion of stored information responsive to authentication of sensed information.

In the example of FIG. 7, the display 770 may be a touch sensitive display that includes touch sensitive circuitry 782. For example, the display 770 may include a cholesteric LCD display with associated circuitry. In such an example, the display 770 may include a cholesteric LCD panel that includes chiral nematic liquid crystals (e.g., chiral nematic liquid crystals, nematic liquid crystals with addition of chiral agent, etc.). Such a display panel may provide for a reflection state and, locally, a non-reflection state. For example, an approximate diagram in FIG. 7 shows a reflection state and a non-reflection or transmission state. As an example, application of force via finger, a stylus or other instrument may orient liquid crystals of a cholesteric LCD display panel in a non-reflection or transmission state such that "markings" appear. As an example, electricity may be applied to reorient crystals in a non-reflection state or transmission state to a reflection state (e.g., to "erase" the markings). For example, in the approximate diagram of FIG. 7, the liquid crystals may be disposed between a glass layer and another layer (e.g., glass or other material optionally with an absorption layer) where optically transparent indium tin oxide (ITO) electrodes are also disposed between the glass layer and the other layer to apply electricity to reorient the crystals. As an example, a cholesteric LCD panel may include one or more polymer stabilizers, features for color(s), etc.

FIG. 7 also shows an example of a method 790 that includes a ready block 792, a write block 794 and an erase block 796. In such an example, the device 700 may enter a ready state responsive to one or more events (e.g., authentication of a fingerprint, touching the device 700, etc.). The ready state may act to apply charge to a cholesteric LCD display to erase any existing marks, writing, etc. to thereby prepare the display for writing such as handwriting by a user of the device 700. In such an example, a user may sign her name on the cholesteric LCD display and then, for example, show the signature to a sales person, a banker, a custodian, etc. As an example, the signature may persist until the device 700 applies a charge to the cholesteric LCD display to thereby erase the signature.

As an example, a device may include a cholesteric LCD display that is operatively coupled to a fingerprint sensor. In such an example, authentication of a fingerprint read via the fingerprint sensor may cause the device to erase information from the cholesteric LCD display and to commence a time window in which a user may write on the cholesteric LCD display. In such an example, upon expiration of the time window, the device may again erase information from the cholesteric LCD display. As an example, a user may sign his or her name during the time window, for example, for purposes of verification of a signature. For example, the device 700 may include a permanent signature (e.g., signed in permanent ink) on a surface of the device 700. As an example, such a surface may be proximate to the display 770 (e.g., below, above, etc.), which may facilitate a comparison of the permanent signature and the ephemeral signature signed via the cholesteric LCD display.

Figure 8:
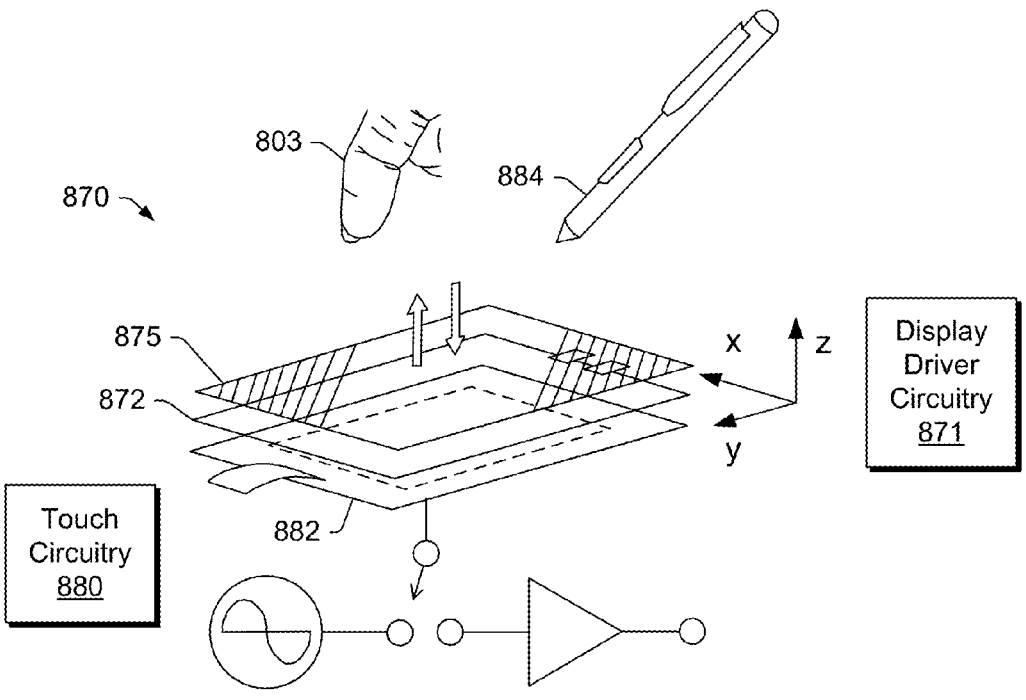
FIG. 8 is a diagram of an example of a display, examples of display circuitry and an example of a method.
Figure 8:
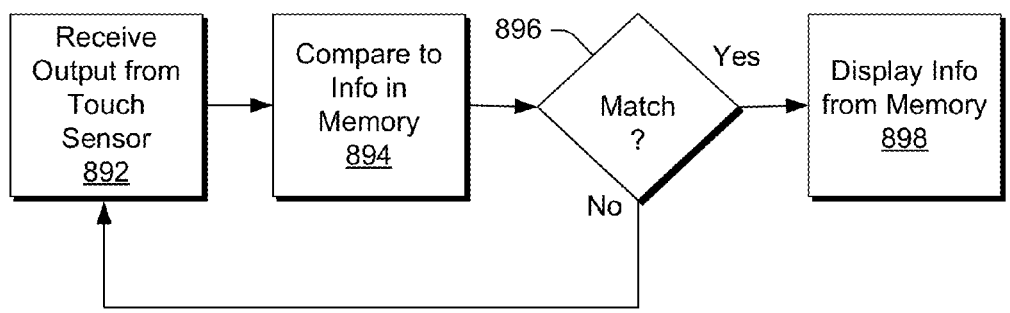

FIG. 8 shows an example of a display 870 that includes display driver circuitry 871 and touch circuitry 880. As an example, the display 870 may be configured as an arrangements of panels including a display panel 872, a cover panel 875 and a touch sensitive panel 882, which may exist in x,y planes arranged along a z-axis. As an example, the touch circuitry 880 may be configured to receive input via a finger 803, a stylus 884 or other implement. As an example, the touch circuitry 880 may include electromagnetic digitizer circuitry, for example, where energy may be induced in a resonant circuit of the stylus 884 by a field generated by the electromagnetic digitizer panel 882. In such an example, the resonant circuit of the stylus 884 may make use of this energy to return a signal to the electromagnetic digitizer panel 882 where input signals may determine, for example, coordinate position, angle, speed, writing pressure, etc. As shown in FIG. 8, circuitry may be configured to switch a field on and off and to receive input signals.

As an example, an electromagnetic digitizer panel may include a sheet manufactured from glass epoxy resin or from a polyimide and PET formed film in which a large number of overlapping loop coils are arranged in a matrix in the x and y axis directions. Where an electromagnetic digitizer panel as in the arrangement of the display 870 is configured for input from one side only, an opposing side may be shielded.

As an example, the display panel 872 may be an LCD flat panel operatively coupled to the display driver circuitry 871. While LCD may be an acronym for "liquid crystal display", LCD finds uses as "LCD display", for example, as an adjective for "display" (e.g., a type of display). As an example, the cover panel 875 may be a protective panel to protect one or more of the other panels from damage (e.g., contact, abrasion, etc.).

As an example, a cholesteric LCD display may include touch circuitry such as, for example, the touch circuitry 880 and, for example, the touch sensitive panel 882. In such an example, writing to the cholesteric LCD display may be sensed via the touch circuitry 880. As an example, sensed writing may be biometric information that may be compared to stored biometric information, for example, for purposes of handwriting authentication (e.g., authentication of a signature).

As an example, a device may include multiple displays where the multiple displays may optionally include different types of displays. For example, a device may include a cholesteric LCD display that may be erasable and include another LCD display with associated LCD display driver circuitry or a display that may be an e-ink display. As an example, a device may include a cholesteric LCD display and an e-ink display. In such an example, the cholesteric LCD display may include touch sensitive circuitry and/or the e-ink display may include touch sensitive circuitry.

Figure 9:
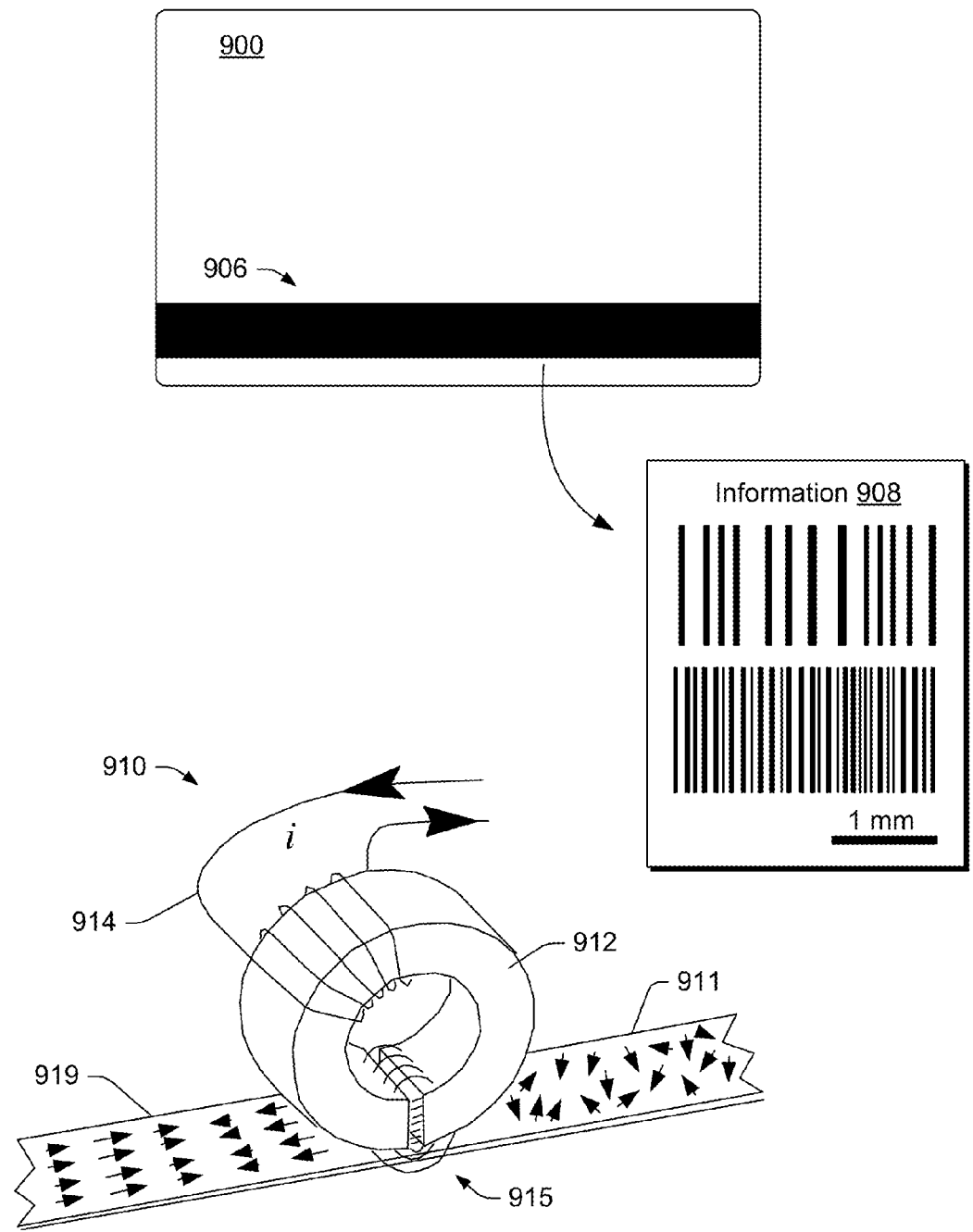
FIG. 9 is a diagram of an example of a card and an example of a mechanism for writing information to the card.

FIG. 9 shows an example of a card 900 that includes magnetic material 906 for storing information 908 (e.g., the card 900 may be referred to as an information storage device). The magnetic material 906 may be characterized in part by a property known as coercivity, which may be in units such as oersteds (Oe). In CGS, the unit of H-field is the oersted (Oe) and the unit of B-field is the gauss (G). In the SI system, ampere per meter (Nm) is used for H-field and tesla (T) is used for B-field. As to CGS to SI conversion, an oersted (Oe) is about 80 ampere per meter (Nm). As units of oersteds (Oe) may be used to characterize, specify, etc. magnetizing field strength, they are related to magnetomotive force (mmf) of current, for example, consider mmf of current in a single-winding wire-loop.

As an example, an H-field may be viewed akin to an electric field E, which starts at a positive electric charge and ends at a negative electric charge. For example, near a north pole lines of an H-field point outwardly while near a south pole lines of an H-field point inwardly (e.g., toward the south pole). A north pole (N) may experience force in a direction of an H-field while force experienced by a south pole (S) may be in a direction opposite to the H-field. In a magnetic pole model, the elementary magnetic dipole (m) may be formed by two opposite magnetic poles of pole strength ($q_m$) separated by a distance vector (d), for example, such that $m=q_m d$.

In the example of FIG. 9, coercivity may define one or more magnetic field properties for encoding, erasing, etc. information in the magnetic material 906. As an example, a low coercivity material may be rated at about 300 Oe while high coercivity material may be rated at about 1,250 Oe or more. As an example, a bank card such as, for example, a credit card or debit card, may include magnetic material rated at about 2,750 Oe. As an example, a card may be provided with a magnetic material such as iron oxide, barium ferrite or other magnetic material.

As an example, a slurry may be formed that is loaded with an amount of magnetic material and, for example, an amount of binder. Such a slurry may be coated onto a substrate such as a card.

FIG. 9 also shows an assembly 910 that includes a core 912 and a coil 914 for encoding information onto magnetic material 911 to produce encoded magnetic material 919. As shown, the core 912 includes a gap such that current carried by the coil 914 causes the core 912 to generate a magnetic field 915. The generated magnetic field 115 can cause magnetic material 911 to align in a manner that represents information to produce encoded magnetic material 919.

As an example, a core may be made of a metallic material upon which turns of wire are wound to form a magnetic read and/or write head. As shown in FIG. 9, the core 912 has a "C" shape. The gap of the core 912, across which magnetic lines of flux exist, may include a gap distance, for example, in a range of about 12 microns to about 50 microns. As an example, a gap may include a gap width (e.g., orthogonal to a gap distance). For example, a gap width may determine width of an encoded track on a magnetic stripe. As an example, a gap width may be specified according to one or more ISO standards. For example, a gap width may be in a range from about 2.5 mm to about 3.2 mm or more.

As an example, the coil 914 may carry current of the order of about 1 mA to about 2500 mA or more such that the core 912 acts as a magnetic head that can encode information in the magnetic material 911. As an example, a write head may employ write currents in a range from about 5 mA to about 100 mA peak-to-peak for a low coercivity magnetic material and, for example, about 100 mA to about 2500 mA peak-to-peak for a high coercivity material. As an example, a write current may depend on a number of turns in a winding (e.g., inductance), core material, etc.

As an example, a method may include encoding information in magnetic material, for example, as in magnetic material that is bound to or otherwise carried by a substrate such as a card (e.g., a card made of plastic and/or other material). As an example, a magnetic recording head may be used to encode or write information in magnetic material, which may be provided as a stripe. For example, alternating current may be carried by a coil about a core such that the core acts as a head that produces alternating zones of north-south and south-north magnetization. Such zones may represent bits of information. In the example of FIG. 9, the information 908 is illustrated as tracks of information stored in magnetic material (e.g., a magnetic medium).

As an example, a card may include one or more tracks of information, for example, that may conform to one or more standards (e.g., consider ISO standards). As an example, a track may include an end sentinel, for example, a character encoded on a magnetic stripe just after particular information (e.g., account information, etc.,) and just before a longitudinal redundancy check (LRC) character. As an example, an ISO standard may specify tracks where, for example, for tracks 2 and 3, the end sentinel is 11111 and where, for example, for track 1, the end sentinel is 111110. Such information may be direction, for example, from left to right.

A characteristic known as remanance may define the extent to which magnetic material remains magnetized after removal of a saturating magnetic field. As an example, remaining magnetic field encoded in magnetic material may be referred to as residual magnetization. As an example, a higher remanance may yield a higher amplitude encoded signal than a lower remanance. As an example, factors such as remanance, loading and thickness of magnetic material (e.g., as a layer) may determine signal amplitude of residual magnetization.

As an example, information may be encoded and defined in part by resolution. Resolution may be defined as a measure of signal amplitude of magnetic material at a higher density versus signal amplitude at a lower density. As an example, resolution may be determined by dividing amplitude at a high density by amplitude at a lower density, for example, to yield a resolution factor from about 0 to about 1.

As an example, an inflection point may be defined as a spot near an x-axis on a magnetic signal waveform where a curve changes direction. Inflection points may be present for digital information (e.g., binary 1s and 0s) at about 3 bits per mm to about 8 bits per mm (e.g., or more). More pronounced evidence of inflection points may be an indicator of higher resolution. As an example, a magnetic stripe of a card may be characterized in part by a spatial bit density that is a linear density that may correspond to an inflection point density. For example, a magnetic stripe of a card may be characterized by a spatial bit density in a range from about 3 bits per mm (e.g., about 30 bits per cm) to about 8 bits per mm (e.g., about 80 bits per cm). As an example, the spatial bit density may differ over the length of a magnetic stripe. As an example, bits may be encoded to represent characters (e.g., alphanumeric characters, numeric characters, etc.). As an example, a character may be specified according to a bit-depth (e.g., 7-bit alphanumeric characters, 5-bit numeric characters, etc.).

As mentioned, a card may include one or more tracks of information. As an example, a reader may be configured to read a track or tracks. As an example, a track may be a standardized track. For example, an International Air Transportation Association (IATA) track is specified to be encoded at 210 bits per inch with a maximum data length of 79 characters (e.g., for encoding an 18 digit primary account number and up to 26 alphanumeric characters that may include a person's name). As another example, consider an American Bankers Association (ABA) track (e.g., for financial transactions), which may be specified to be encoded at 75 bits per inch with a maximum data length of 40 numeric characters (e.g., for encoding a 19 digit account number). As yet another example, consider a track that may be used by financial institutions to store an encrypted PIN code, country code, currency units, amount authorized, subsidiary account information, and other account restrictions. Such a track may be, for example, encoded at 210 bits per inch with a maximum data length of 107 numeric digits.

As mentioned, a card may include one or more tracks of information. As an example, a reader may be configured to read a track or tracks. For example, a reader may include a read head configured to read a track or tracks as a card is swiped past the read head (e.g., translated with respect to a read window or read windows of the read head). As to data rates, as an example, for a range of spatial bit densities from about 30 bits per cm to about 80 bits per cm and a range of "swipe speeds" from about 20 cm per second to about 50 cm per second, data rates may be in a range from about 600 bits per second to about 4000 bits per second.

Where information is encoded on a substrate such as a card and where the card is lost, stolen, "borrowed", etc., the information may be used illicitly (e.g., without authorization). For example, a lost credit card may be run through a reader to allow one to determine what information exists on the card (e.g., accounts, etc.). As another example, where a card is temporarily given to another, that person may swipe the card through a reader for a legitimate purpose and also swipe the card through a reader for an illegitimate purpose. For example, the person may have a reader for the purpose of stealing information.

As mentioned, a bank card may have a stripe with high coercivity magnetic material, for example, rated at about 2,750 Oe. High coercivity may be beneficial to a card holder as the magnetic flux carried by the magnetic material may persist for years and be relatively stable even when exposed to stray fields (e.g., from household electronics, vehicles, etc.). Such a card may be considered to be persistent or in an always "on" state. In other words, bits of information may be persistently present as magnetic field inflection points encoded in magnetic material of a stripe of such a card.

Figure 10:
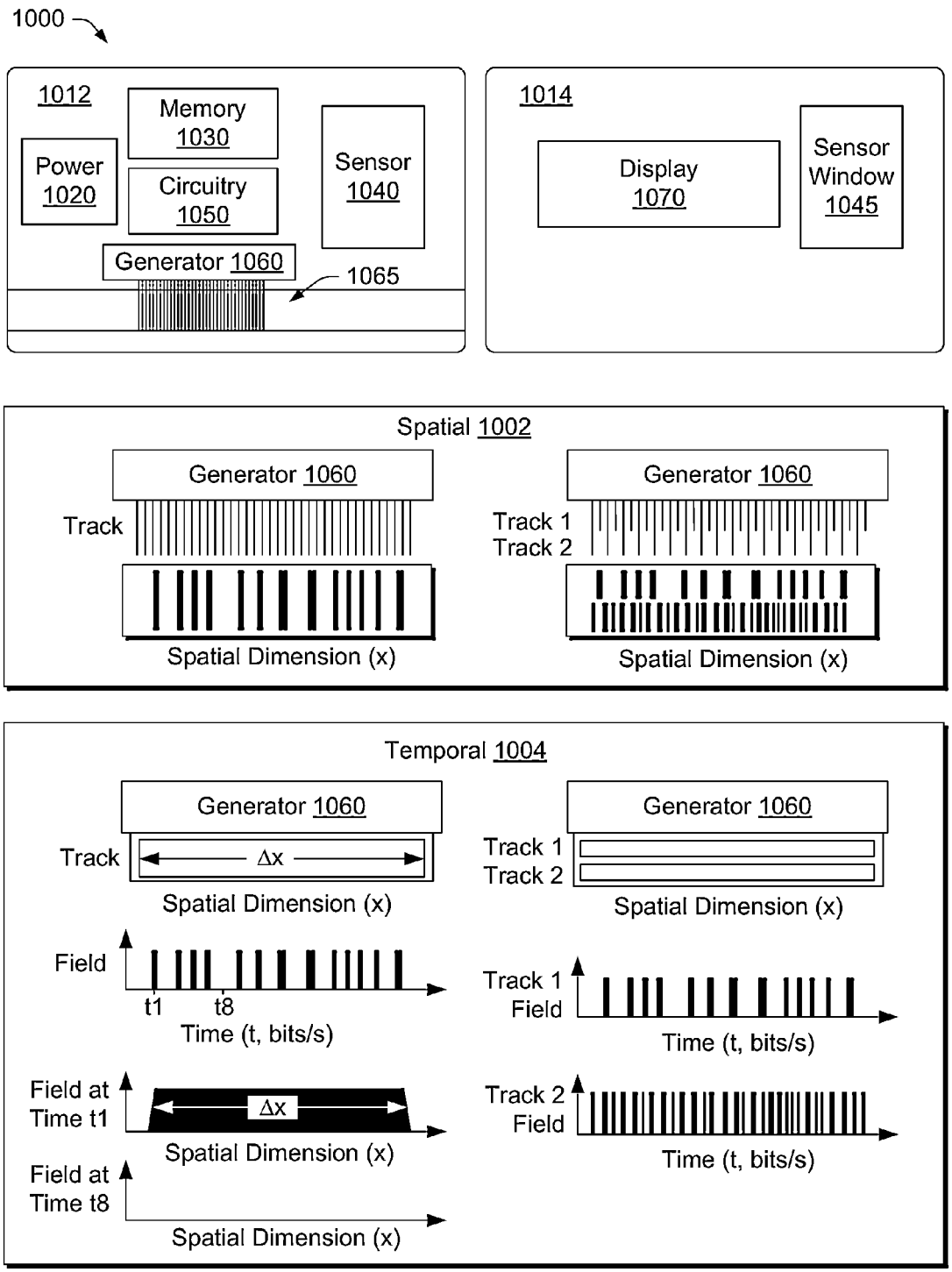
FIG. 10 is a diagram of an example of a device and examples of emission techniques for emitting at least one magnetic field.

FIG. 10 shows an example of a card 1000 that includes opposing sides 1012 and 1014. As shown in the example of FIG. 10, the card 1000 includes a power source 1020, memory 1030, a sensor 1040 that includes a sensor window 1045, circuitry 1050, a generator 1060 that may generate a field, for example, with respect to a field window or emissions window 1065, and a display 1070. As an example, the sensor window 1045 and the emissions window 1065 may be defined with respect to a coordinate system such as, for example, a Cartesian coordinate system (see, e.g., x and y coordinates in FIG. 10).

In the example of FIG. 10, the card 1000 includes the memory 1030 that may store information; the sensor 1040 that may sense information; the circuitry 1050 that may authenticate sensed information (e.g., authentication circuitry); the generator 1060 that may output at least one magnetic field, for example, based at least in part on a portion of stored information responsive to authentication of sensed information; and the display 1070 that may display information, optionally based at least in part on a portion of stored information and, for example, responsive to authentication of sensed information. As an example, the display 1070 may be a touch sensitive display. As an example, the display 1070 may be or include a cholesteric LCD display. As an example, the display 1070 may be or include an e-ink display.

FIG. 10 also shows some examples of spatial schemes 1002 and temporal schemes 1004 for outputting at least one magnetic field. For example, the generator 1060 may be configured to output one or more tracks of spatial magnetic fields. As shown with respect to the spatial schemes 1002, a spatial magnetic field may be defined with respect to one or more coordinates such as, for example, an x-coordinate; noting that in FIG. 10, the illustrated features are approximate as resolution may be finer (see, e.g., the information 908 of FIG. 9). As an example, a spatial magnetic field may vary in field strength with respect to a spatial coordinate. In such an example, the spatial magnetic field may form inflection points that may define bits of information. As an example, the circuitry 1050 of the card 1000 may instruct the generator 1060 as to information to be output.

As to output of at least one or more tracks of temporal magnetic fields, as shown with respect to the temporal schemes 1004, the generator 1060 may be configured to output one or more tracks of temporal magnetic fields, for example, via one or more emission windows, which may be spatially located. For example, an emission window may span a distance Δx and provide output as to one or more tracks of information. As shown in FIG. 10, a temporal scheme may output fields with respect to time (t) to effectively output bits of information with respect to time (t). For example, FIG. 10 shows an approximate plot of field strength versus time (t), which includes times t1 and t8. As shown, at time t1, the field output by the generator 1060 may be at an elevated value and relatively uniform across the emissions window that spans the distance Δx; whereas, at time t8, the generator 1060 may output no field or, for example, a diminished field (e.g., at a diminished value) across the emissions window that spans the distance Δx. In such an example, the generator 1060 may generate field inflection points with respect to time where the field inflection points encode information (e.g., bits of information) that may be, for example, read by a reader.

FIG. 10 also shows a temporal scheme for multiple tracks (Track 1 and Track 2) where, for example, the generator 1060 may generate fields for Track 1 and may generate fields for Track 2. In such an example, the fields for each of the multiple tracks may differ. As an example, the generator 1060 may optionally be configured for output of one or more tracks where, for example, multiple tracks may optionally be output simultaneously (e.g., to be read via a single swipe with respect to a reader).

As shown with respect to the temporal schemes 1004, a temporal magnetic field may be defined with respect to a temporal coordinate, time (t). As an example, a temporal magnetic field may vary in field strength with respect to time (t).

As to the sensor 1040 of the card 1000 of FIG. 10, it may be a biometric sensor such as, for example, a fingerprint sensor. As an example, the sensor 1040 may include one or more types of circuitry. For example, the sensor 1040 may be configured as a capacitance sensor, which may sense passive and/or active capacitance.

In the example of FIG. 10, the circuitry 1050 may receive signals from the sensor 1040 and analyze the signals with respect to stored information, for example, as stored in the memory 1030. As an example, an analysis may include processing the signals to determine characteristics such as fingerprint characteristics and comparing at least a portion of the determined characteristics to at least a portion of stored fingerprint characteristics, for example, to decide whether a match exists between a sensed fingerprint and a known fingerprint. Such an approach may act to authenticate biometric information sensed via the sensor 1040. Responsive to authentication of biometric information, the circuitry 1050 may cause, for example, the generator 1060 to generate at least one magnetic field. For example, the circuitry 1050 may control the generator 1060 to generate at least one magnetic field based on information associated with an identity that has been authenticated via sensing biometric information via the sensor 1040. As an example, information associated with an identity may be or include account information, security information, control information, etc.

As an example, a device may include memory that stores account information and biometric information; a sensor that senses biometric information; authentication circuitry that authenticates sensed biometric information at least in part via a comparison to stored biometric information; and a field generator that outputs at least one magnetic field based at least in part on a portion of the stored account information responsive to authentication of sensed biometric information. In such an example, the device may have a card form factor (e.g., the device may be a card).

As an example, the generator 1060 may output at least one magnetic field based at least in part on a portion of stored information responsive to authentication of sensed information. In such an example, the generator 1060 may output at least one magnetic field for a period of time. For example, the generator 1060 in the example of FIG. 10 may output at least one magnetic field for a period of time of the order of tens of seconds. As an example, a generator may output at least one magnetic field for a period of time in a range from about 10 seconds to about 120 seconds. As an example, where a generator may output at least one magnetic field to a medium (e.g., a medium that include magnetic material), a period of time may be sufficient to write information to the medium. In such an example, a period of time may be less than about 10 seconds and may be, for example, less than about 1 second.

As an example, an energy conservation algorithm may be implemented by a generator that outputs at least one magnetic field. For example, a generator may output pulses, for example, at a pulse frequency. As an example, a pulse frequency may be selected based in part on one or more characteristics of a reader (e.g., a read head and/or associated circuitry).

As an example, a generator may output at least one magnetic field based at least in part on a portion of stored information responsive to authentication of sensed information with a delay, further in response to a trigger, etc. For example, where the card 1000 is a card for performing a financial transaction, in response to authentication of sensed information, a generator may delay generation of output for a period of time of the order of seconds, which may correspond to a delay between possession of the card by an authorized (e.g., authenticated) card holder and positioning of the card with respect to a reader.

As to a trigger, the card 1000 may include circuitry, optionally operatively coupled to the sensor 1040, which can detect presence of a reader. For example, a reader may include a slot and a card may include a sensor that can determine when the card is positioned in the slot. In such an example, responsive to authentication of sensed information, sensor circuitry may be activated that may, in response to detection of the card being positioned in the slot of the reader, cause a generator to generate at least one magnetic field to be read by the reader (e.g., one or more read heads of the reader).

As an example, a trigger may cause a generator to generate at least one magnetic field for a period of time, which may be a period of time sufficient for a reader to read the at least one magnetic field (e.g., a period of time of the order of seconds). As an example, the trigger may be programmed to allow for a predetermined number of swipes (e.g., attempts). For example, if the card detects a slot more than three times (e.g., three swipes or attempts), it may reset the card with respect to authentication of sensed information such that re-authentication is required before the generator will generate at least one magnetic field (e.g., that represents information such as account information, etc.).

As an example, various techniques, technologies, etc. may act to conserve energy of a power source and/or may act to enhance security of a card such as the card 1000.

Figure 11:
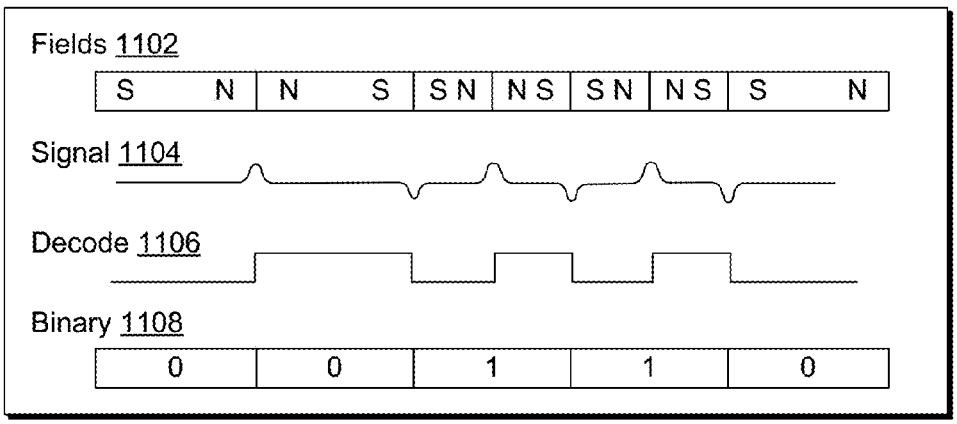
FIG. 11 is a diagram of an example of a system.
Figure 11:
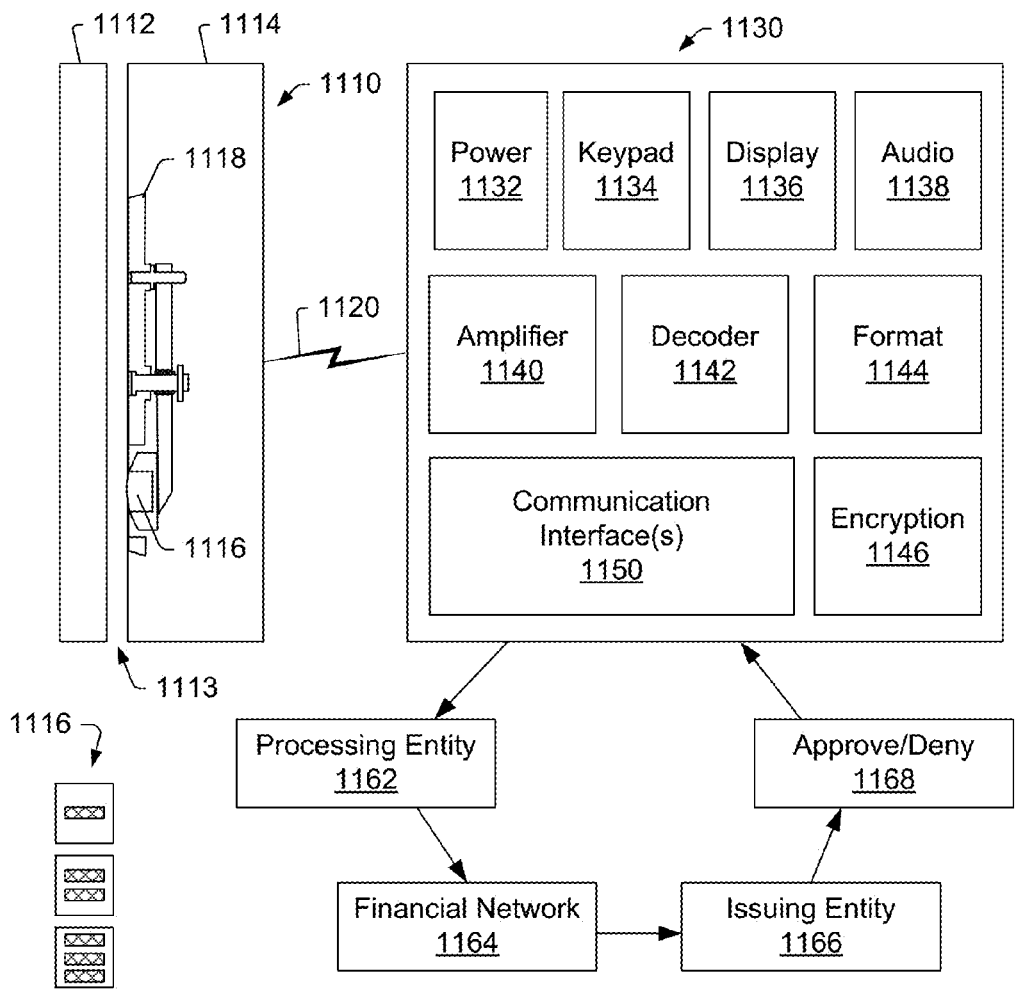

FIG. 11 shows an example of a system 1100 that includes a reader 1110 operatively coupled to circuitry 1130, for example, via a link 1120 (e.g., a wired link, a wireless link, etc.). As an example, the reader 1110 may read one or more magnetic fields 1102 and generate a signal 1104 that the circuitry 1130 may receive and decode to provide decoded information 1106 that may be further processed by the circuitry 1130 to provide formatted information 1108, for example, in a binary format. In such an example, the signal 1104 may be encoded per an encoding scheme such as, for example, the F2F (Aiken Biphase) encoding scheme (e.g., per ISO/IEC-7811) where, in the approximate illustration of FIG. 11, a "0" may be represented as a single magnet two units in length and a "1" may be represented as two magnets that are each one unit in length (see, e.g., the flux transitions in the signal 1104).

In the example of FIG. 11, the reader 1110 includes two portions 1112 and 1114 that define a slot 1113. As shown, a read head 1116 is positioned facing the slot 1113 via a mechanism 1118, which may, for example, include an arm and a spring that carry and bias the read head 1116. As an example, the read head 1116 may include one or more track circuits, for example, to read one or more tracks of information (e.g., tracks of magnetic fields). As shown, the reader 1110 and the circuitry 1130 are linked via the link 1120 such that signals read by the read head 1116 may be transmitted to the circuitry 1130 (e.g., via a wired link, a wireless link, etc.).

As an example, an emissions window of a device (e.g., such as a card, etc.) may be positioned on the device such that it can emit signals to be read by a read head such as the read head 1116. As an example, an emissions window may emit signals outwardly in one direction or, for example, outwardly in two directions (e.g., to optionally allow for multiple orientations of a device with respect to a read head). As mentioned, as an example, a device may include an emissions window that emits signals where such signals may be read by a read head when the device is stationary with respect to the read head. For example, a device may be positioned in the slot 1113 for a period of time (e.g., without translating the device) during which signals are emitted by the device (e.g., via an emissions window) such that a read head may read the emitted signals.

As shown in the example of FIG. 11, the circuitry 1130 may include a power supply or connector 1132, keypad circuitry 1134, display circuitry 1136, audio circuitry 1138, amplification circuitry 1140, decoder circuitry 1142, format circuitry 1144, encryption circuitry 1146 and one or more communication interfaces 1150.

As an example, signals read by the read head 1116 may be transmitted to the amplification circuitry 1140 via the link 1120. The amplification circuitry 1140 may optionally include automatic gain control (AGC) circuitry that may adjust amplitude of received signals (e.g., input waveforms), for example, to enhance dynamic range. As an example, the decoder circuitry 1142 may include analog-to-digital conversion (ADC) circuitry that can convert received signals, for example, as adjusted by the amplification circuitry 1140. As an example, the amplification circuitry 1140 may include ADC circuitry, for example, to monitor input signal levels and adjust programmable gain amplification (PGA) circuitry. As an example, the amplification circuitry 1140 may include a peak and hold circuit (e.g., to hold one or more peak amplitudes). As an example, ADC circuitry may be implemented for peak detection and may operate in a range, for example, from about 100 ksps to about 1 Msps.

As an example, the format circuitry 1144 may format output from the decoder circuitry 1142, which may be then encrypted via the encryption circuitry 1146, for example, to encrypt formatted information prior to transmission via at least one of the one or more communication interfaces 1150. As an example, the encryption circuitry 1146 may provide for error checking. For example, the encryption circuitry 1146 may be configured according to an algorithm that performs, at least in part, a checksum. As an example, consider the Luhn algorithm (e.g., modulus 10 algorithm) that may include a checksum formula that may be implemented to validate information such as, for example, an identification number (e.g., a credit card number, etc.).

As an example, the circuitry 1130 may include one or more operational amplifiers (e.g., for a signal gain stage), one or more PGAs (e.g., for one or more AGCs), one or more ADCs (e.g., single or multichannel, about 12-bit depth, etc.), one or more digital-to-analog converters (DACs), one or more comparators, one or more sample and hold circuits, and optionally a microcontroller (e.g., an ARM-based microcontroller, an ARC-based microcontroller, etc.). As an example, the circuitry 1130 may include a processor, which may be or include a microcontroller.

As an example, the system 1100 may be implemented as a POS system. For example, the circuitry 1130 may transmit information to a processing entity 1162 that may direct information to an appropriate financial network 1164 for transmission to, for example, an issuing entity 1166. In such an example, the issuing entity 1166 may make a determination as to whether a financial transaction associated with the information transmitted by the circuitry 1130 is approved or denied. As shown in the example of FIG. 11, an approval or a denial 1168 may be transmitted for receipt by the circuitry 1130 via at least one of the one or more communication interfaces 1150. Such a loop may be considered to include an authorization request (e.g., for a particular amount of currency) and an authorization response (e.g., approved or denied).

As an example, information output via a window (e.g., a display window, an emissions window, etc.) may pertain to a single-use account (SUA), a controlled-use account, controlled use accounts, digital currency or other type of information. As an example of digital currency, consider a cryptocurrency such as the Bitcoin currency. As an example, a cryptocurrency unit such as, for example, a bitcoin unit (BTC) may be a single-use account as, according to various standards, ownership may be transferred once (e.g., for a payor/payee transaction). As an example, while a BTC is mentioned, multiples of a BTC and fractions of a BTC may be considered a "unit" of digital currency (e.g., a bitcointon, a santoshi, etc.) the ownership of which may be transferred as a single-use account.

As an example, a temporal field such as one of the temporal fields of the temporal schemes 1004 of FIG. 10 may allow for placing a card in a reader without translating the card in the reader as the temporal aspect of the field may mimic a bit rate achieved via swiping. For example, a generator may output a temporal field that varies in strength (e.g., to create inflection points) at a rate that matches a rate (e.g., within an operable range of rates) of a read head or read heads (e.g., of a reader, etc.). As mentioned, a reader for a magnetic stripe card may be configured to operate within a range of data rates, for example, consider a range from about 600 bits per second to about 4000 bits per second.

As an example, a method may include emitting magnetic fields via a stationary emissions window of an apparatus at a data rate that matches a data rate of magnetic field read circuitry (e.g., a read head). In such an example, the magnetic fields may include magnetic field inflection points that occur with respect to time that represent bits of information. In such an example, the magnetic field read circuitry may decode the bits of information as emitted via the stationary emissions window.

As an example, a device may include a power source, memory, a sensor, circuitry that includes a controller, and a generator and/or a display. As an example, a power source may be a battery or batteries. As an example, a battery may be a lithium-ion-based battery or other type of battery. As an example, a controller may be a microcontroller, for example, such as an ARC-based microcontroller, an ARM-based microcontroller, etc. As an example, the controller may be or include a processor.

As an example, circuitry of a device may be configured for fingerprint recognition, handwriting recognition, information management, duration(s), rules, temperature, display, track(s), power and/or other functionality.

As an example, a device may include tactile output circuitry that can, for example, control a mechanism that can raise a surface of the device in a manner that may be visually read, tactilely felt, processed via an impression reader, etc. For example, a POS system may be electronic (e.g., ETS) or non-electronic. A non-electronic POS may include multi-layer purchase slips to record credit card information, for example, where raised characters on the credit card can make a carbon copy impression of the credit card when a roller slides across a tray of a POS device. As an example, a manual credit card machine may help facilitate a transaction in the event of a power outage or problem with an automated regular credit card machine. As an example, a tactile output may output information for a period of time in an active state before returning to a wait or sleep state.

As an example, a device may store information for one account in association with a right hand thumb and may store information for another account in association with a left hand thumb. In such an example, an authentication algorithm may determine whether sensed biometric information is associated with an identity and an account. In turn, a generator may generate at least one magnetic field for one of a plurality of accounts. As an example, a device may be configured with information for a plurality of accounts where an association exists between individual fingerprints and individual accounts.

As an example, a display of a device may display information such as, for example, a transaction identifier (e.g., "Number for this purchase: 9876 7888 1234 4444"), a name, a credit card or debit card number, an expiration date, a code, etc.

As an example, a method may include simulating a magnetic swipe card capability with a microcontroller managed emitter and a fingerprint reader, for example, as packaged according to a standard credit card format. In such an example, a stripe region on a card may be a thin film magnetic film configured to emit at least one magnetic field (e.g., via generator circuitry). As an example, the film may run a length of a card or a portion thereof. As an example, when activated, the film may act to transmit magnetic signals at a data rate, for example, akin to swiping the card at normal speed through a reader.

As an example, a detector (e.g., optical, magnetic, electric, capacitive, etc.) may determine a card is being swiped and, for example, initiate information transmission. As an example, a card may include a fingerprint reader, for example, optionally coupled to a microcontroller. As an example, a fingerprint reader may include a detector that acts to power on a microcontroller, for example, such that battery power is used when the fingerprint reader is covered by a finger (e.g., finger or thumb or combination thereof).

As an example, a microcontroller may prohibit transmission of card data unless an authorized fingerprint had been detected (e.g., authenticated). As an example, a card may not have account information externally thereon.

As an example, a security mechanism may allow for transmission of card data and/or display of card data when a valid fingerprint is detected. As an example, a card may be configured to transmit and/or display card data for a short period (e.g., about 20 seconds) after a fingerprint has been validated (e.g., authenticated).

As an example, a user (e.g., card owner, authorized card holder, etc.) may get ready to make a transaction, remove a card from his wallet and put his finger on a sensor window of the card. The user may then hand the card to a clerk who then swipes the card through a slot of a reader. In such an example, the card may determine that a swipe is in process and transmit card data (e.g., information stored in memory of the card) for reading by a read head of the reader (e.g., which may be a POS device). As an example, a timeout may occur (e.g., via a timer circuit) such that the card becomes locked and cannot be used until a valid fingerprint is read again.

As an example, a device may include a display; memory that stores biometric information and commercial information; a sensor that senses biometric information; authentication circuitry that authenticates sensed biometric information at least in part via a comparison to stored biometric information; and display circuitry that renders at least one graphic to the display based at least in part on a portion of the commercial information responsive to authentication of sensed biometric information. In such an example, the device may have a form factor such as a card form factor, which may be, for example, a credit card form factor, an identity card form factor, etc.

As an example, a graphic may be or include a text character. As an example, a graphic may be or include a numeric character. As an example, a graphic may be or include a universal product code (UPC). As an example, a graphic may be or include a quick response code (QRC).

As an example, commercial information may be or include account information. As an example, commercial information may include account information for a plurality of accounts. As an example, a device may include selection circuitry that selects one of the plurality of accounts. As an example, selection circuitry may be operatively coupled to a sensor where, for example, the selection circuitry receives output from the sensor for selection of the one of the plurality of accounts. As an example, a sensor may be a fingerprint sensor and a touch input sensor (e.g., a touchpad, etc.). As an example, display circuitry may be configured to scroll graphic renderings for a plurality of accounts, for example, optionally responsive to successive authentications of sensed biometric information. As an example, a device may include a timer that determines whether an authentication is a successive authentication.

As an example, a device may include a button operatively coupled to selection circuitry. As an example, a button may be part of navigation circuitry where, for example, touches may cause scrolling through information accompanied by rendering of such information to a display. As an example, a display may be a touch sensitive display. In such an example, the display may be or include a button.

As an example, a device may include a handwriting sensor. As an example, display circuitry of a device may be configured to render a graphical representation of sensed handwriting to a display.

As an example, a device may include a sensor that includes a sensor window that at least partially overlaps a display. For example, a fingerprint sensor may be at least partially overlapping a display. In such an example, the display may include touch circuitry, which may be, for example, capacitive touch circuitry. In such an example, the touch circuitry may be configured for sensing a fingerprint and for inputting touches, for example, to navigate information, to select information, etc.

As an example, a device may include a battery as a power source. For example, a device may include a lithium-ion type of battery, which may optionally be rechargeable.

As an example, a method can include sensing biometric information via a sense window of a card; authenticating the biometric information with respect to an identity; and responsive to the authenticating, outputting via a display of the card at least one graphic that represents commercial information associated with the identity. In such an example, the sense window may be or include a sense window of a fingerprint sensor. As an example, a sense window may be or include a sense window of a handwriting sensor.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 12:
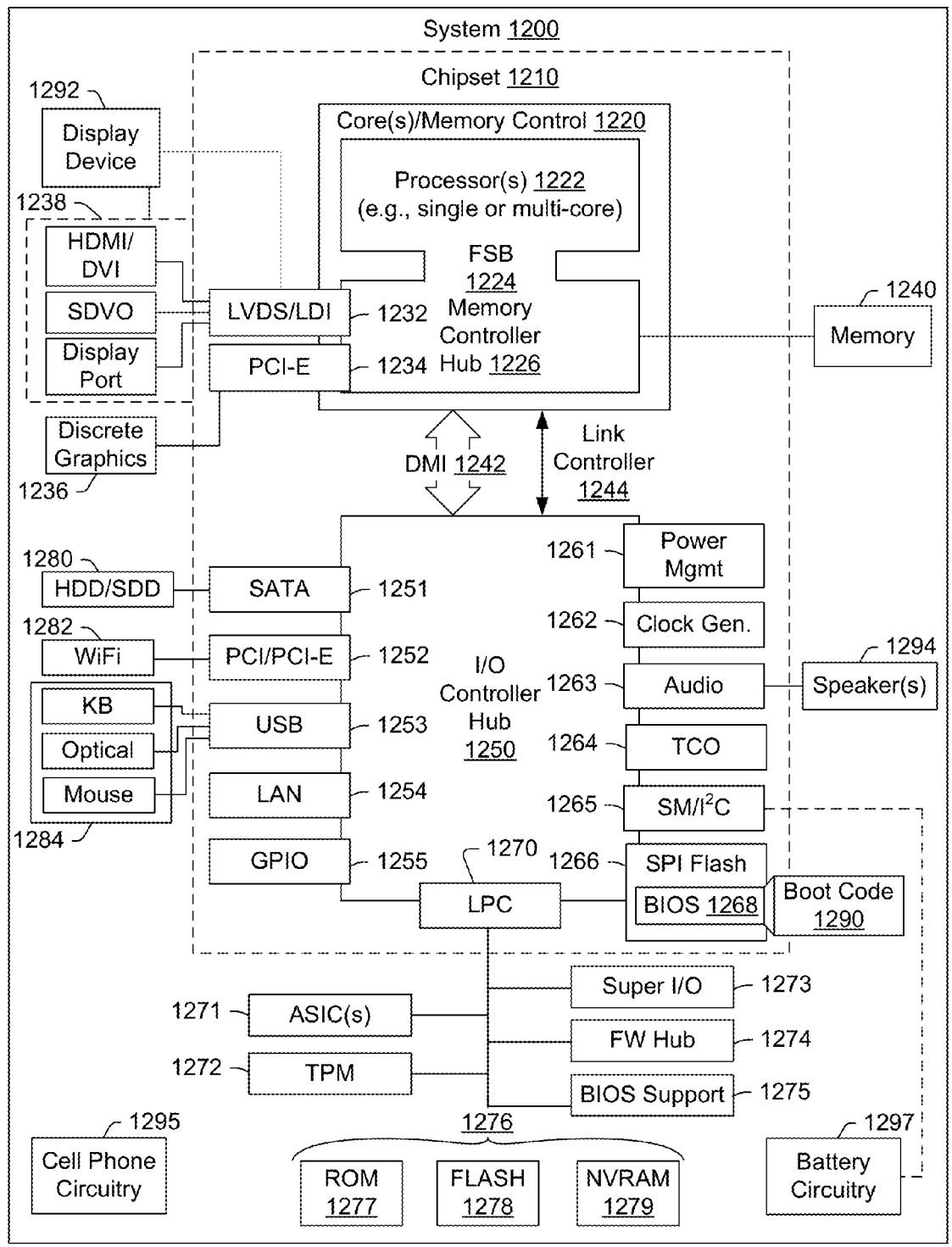
FIG. 12 is a diagram of an example of a system that includes one or more processors.

While various examples of circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1200. As described herein, a device such as a reader device, another device, etc. may include at least some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An electronic card comprising:
    a graphical display disposed on a side of the electronic card;
    memory that stores biometric information and commercial information;
    a sensor disposed on the electronic card and separate from the display wherein the sensor senses biometric information and senses touch input;
    authentication circuitry that authenticates sensed biometric information from the sensor at least in part via a comparison to stored biometric information;
    display circuitry that renders at least one graphic to the display based at least in part on a portion of the commercial information responsive to authentication of sensed biometric information;
    handwriting recognition circuitry that recognizes handwriting from the sensor based at least in part on touch input received via the sensor; and
    navigation circuitry that scrolls information rendered to the graphical display based at least in part on touch input received via the sensor.

2. The electronic card of claim 1 wherein the device comprises a standardized card form factor.

3. The electronic card of claim 1 wherein the at least one graphic comprises at least one character.

4. The electronic card of claim 1 wherein the at least one graphic comprises a universal product code (UPC).

5. The electronic card of claim 1 wherein the at least one graphic comprises a quick response code (QRC).

6. The electronic card of claim 1 wherein the commercial information comprises account information.

7. The electronic card of claim 1 wherein the commercial information comprises account information for a plurality of accounts.

8. The electronic card of claim 7 comprising selection circuitry that selects one of the plurality of accounts.

9. The electronic card of claim 8 wherein the selection circuitry is wherein the selection circuitry receives output from the sensor for selection of the one of the plurality of accounts.

10. The electronic card of claim 8 comprising a button coupled to the selection circuitry.

11. The electronic card of claim 7 wherein the display circuitry scrolls graphic renderings for the plurality of accounts responsive to successive authentications of sensed biometric information.

12. The electronic card of claim 11 comprising a timer that determines whether an authentication is a successive authentication.

13. The electronic card of claim 1 wherein the sensor comprises a fingerprint sensor and a touch input sensor.

14. The electronic card of claim 1 wherein the display circuitry renders a graphical representation of sensed handwriting to the display.

15. The electronic card of claim 1 comprising a battery.

* * * * *